March 31, 1964  H. KARSH  3,126,886
AUTOMATIC SPHYGMOMANOMETER
Filed June 26, 1961  2 Sheets-Sheet 1

*INVENTOR.*
HERBERT KARSH
BY Robert J. Schiller
ATTORNEY

United States Patent Office 3,126,886
Patented Mar. 31, 1964

3,126,886
AUTOMATIC SPHYGMOMANOMETER
Herbert Karsh, Lexington, Mass., assignor to Epsco, Incorporated, Cambridge, Mass., a corporation of Massachusetts
Filed June 26, 1961, Ser. No. 119,492
6 Claims. (Cl. 128—2.05)

This invention relates to devices for determining pressure, and more specifically to a pressure determining device particularly useful in automatically measuring arterial blood pressure levels.

The principles of sphygmomanometry are well known. For instance, the typical manual system employs an inflatable arm cuff in conjunction with a microphone and either a mercury or aneroid manometer. The physician or operator wraps the cuff upon a patient's limb, inflates the cuff until the air pressure in the latter reduces arterial circulation in the body member to a point at which the patient's pulse is no longer audible in the microphone or stethoscope. By opening a bleeder flap on the cuff, the latter is allowed to deflate slowly until pulse sounds again become audible. The air pressure in the cuff is then considered to be a reasonably accurate determination of the systolic pressure. The air pressure in the cuff is further reduced until complete circulation is restored at which point arterial pulse sounds are again no longer audible. The cuff air pressure, as registered on the manometer, is then considered to be a reasonably accurate determination of the diastolic pressure.

The present invention concerns automatic sphygmomanometry based on accurate determination of systolic and diastolic end points of the auscultatory pulse train by electronic logic circuitry. Several advantages are gained by the present invention over either or both manual and automatic sphygmomanometric techniques of the prior art. For one, the present invention employs a small number of electronic components which additionally are not prone to position error as is the case with mercury manometers. Further, because the invention operates on the basis of unambiguous pulses, the interference due to noise in determining end points is minimized, and the end points are determinable with high accuracy. Particularly, the operation of the invention does not depend on the vagaries of an individual's auricular capabilities and his observational facility of the moving mercury column or aneroid needle as the case may be.

It is therefore a principal object of the invention to provide a novel device for positively determining the systolic and diastolic end points of a blood pressure gradient which has associated with it a sequence of pulse sounds. Other objects of the present invention are to provide an electronic device capable of accurately discriminating between and identifying the end points of such a pressure gradient during measurements along the gradient in only one direction; to provide a new and improved apparatus of the type described which is highly adaptable for use with a variety of pressure- or sound-to-electrical signal input transducers and a variety of readout devices; to provide a new and improved apparatus of the type described for determining end points of such a pressure gradient utilizing positive electronic techniques.

Other objects of the present invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein.

The present invention concerns highly adaptable apparatus for determining the end points of a pressure gradient and having a pair of outputs respectively corresponding to the gradient extremes of end points. The outputs, being electrical, lend themselves readily to the actuation of readout devices indicative of the end point pressures, indicative of the pressure differential itself, or for the control of other devices such as alarms and the like. More specifically, the present invention contemplates a combination of a sound-to-electrical signal transducer, means responsive to electrical signals from the transducer for establishing the initial and terminal points of a pressure gradient having associated therewith the presence of a pulse train of sounds, and means responsive to the determination of the end points of the sound train for controlling indicators or other devices in accordance therewith.

The present invention is best described in connection with arterial pulse sounds present during sphygmomanometric determination of arterial pressures. In such instance, the present invention includes a sound transducer, such as a microphone, and a logic circuit having an input from the microphone and having a pair of outputs. One of the outputs is actuated by the appearance of arterial pulse sounds which appearance corresponds, for example, to systolic arterial blood pressure; the other output is actuated by the disappearance of pulse sounds occurring, for example, approximately at diastolic pressure. Means are provided for collapsing an artery in an extremity of a subject individual by the application of a pressure gradient thereto. Because a portion of the pressure gradient has associated therewith pulse sounds, the logic circuit is adapted to produce output signals which indicate respectively the initiation and termination of these pulse sounds.

The logic circuit is capable of operating in a single direction along the pressure gradient, i.e., it is not necessary to proceed, as in prior art automatic sphygmomanometers, along the pressure gradient in both directions to determine both auscultatory end points by the appearance of the arterial pulse sounds. The logic circuit basically comprises means for detecting an initial pulse sound indicative of one end point and for producing an output responsively thereto, and means for producing an output signal representing the other end point of the pressure gradient responsively to termination or disappearance of the train of arterial pulse sounds. To accomplish this, the logic circuit includes a device for inhibiting the latter means from producing an output for at least as long as arterial pulse sounds can be picked up by the microphone during a pass through the pressure gradient.

Figure 1:
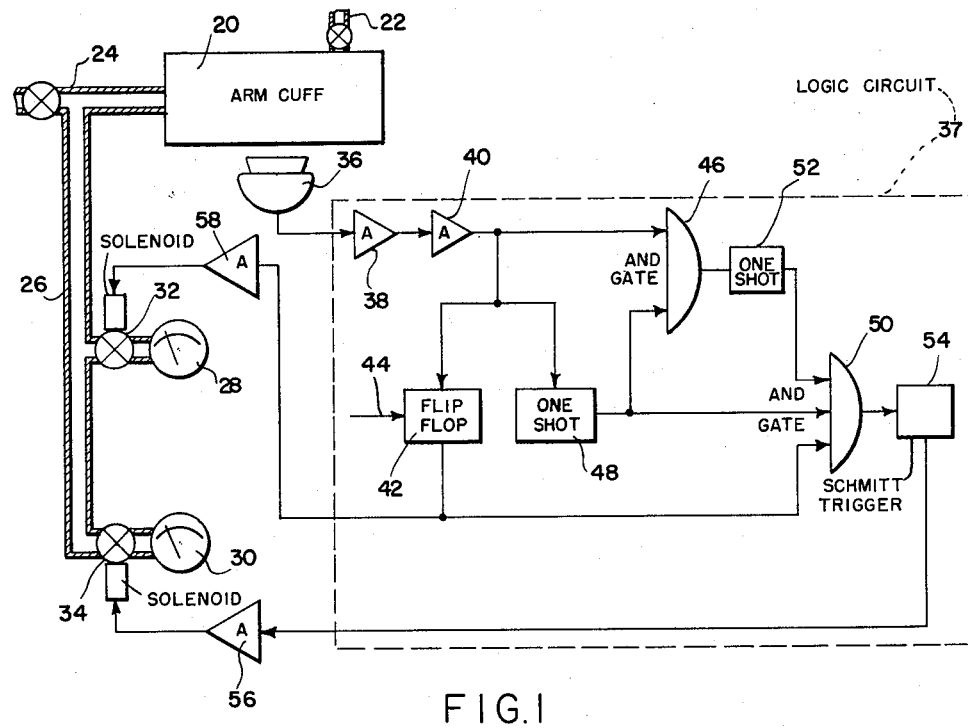
FIGURE 1 is a schematic diagram showing the mechanical components of the invention and including a block diagram of the electronic elements.

Referring now to FIG. 1, there is shown a schematic diagram of one embodiment of the invention in which there is the usual pneumatic, inflatable element, such as arm cuff 20, having a bleeder valve 22 for deflating the cuff and inlet means, such as valved conduit 24, for transferring a fluid such as air under pressure to the cuff from a high pressure source (not shown). Conduit 24 is also coupled by means, such as subsidiary air-line 26, to a pair of indicator devices, such as pressure gauges 28 and 30, respectively, through shut-off devices such as solenoid-operated valves 32 and 34.

The invention also includes a transducer, such as microphone 36, for detecting pulse sounds and for converting the sounds into electrical signals. The microphone output is connected to the input of a logic circuit indicated by the reference numeral 37 and including amplifier 38, the latter preferably being a linear amplifier capable of increasing the amplitude of the signal from the microphone and including filtering components such as a band-pass filter for removing noise. The output of amplifier 38 is connected to the input of a threshold device, such as secondary amplifier 40, for converting input pulses from amplifier 38 to specified, sharp pulse waveform. This insures proper operation of the logic circuit despite wide variations in the waveform of the original analog signal originating at microphone 36. Under some circumstances the amplitude of the input pulses to amplifier 38 will be quite low and the noise-to-signal ratio of the output of amplifier 38 might cause ambiguities. Hence, amplifier 40 is so constructed, as well known in the art, that when an input pulse thereto exceeds a predetermined minimum which allows the pulse to be discriminated from background noise, the amplifier will deliver an output pulse of optimum amplitude and waveform.

The logic circuit includes means for providing a signal representing one end point of the pressure gradient responsively to the initiation of the pulse output from amplifier 40. Such means, in the embodiment shown, is in the form of a bi-stable element, such as flip-flop 42, having a pair of input terminals, one of which is connected to the output of amplifier 40. A typical flip-flop, for instance, comprises a pair of switching transistors, the base of each being respectively coupled through a corresponding resistance to the collector of the opposite transistor so that the pair of transistors can assume either one or the other of two stable states: an unset or "off" condition where no output is delivered, or a set or "on" conduition which causes an output signal to be delivered by the flip-flop, either state being established in accordance with a command signal. As shown in FIG. 1, flip-flop 42 is normally in an unset or off condition, hence, delivers no output signal. When a command in the form of an initial pulse from amplifier 40 is impressed on flip-flop 42, the latter is placed into set condition and will deliver an output signal. Only a reset signal applied to the other input 44 of flip-flop 42 will reverse the state of the latter and return it to its unset condition, cutting off the output signal.

The logic circuit also includes means for producing an output signal representing the other end point of the pressure gradient, and means for inhibiting the aforementioned means from producing a signal until the pulse sounds associated with the pressure gradient are no longer detected by the microphone. To this end, the invention includes gating means, such as AND gate 46, having a pair of input terminals to one of which the output of amplifier 40 is also connected. There is also provided signal generating means comprising, in the form shown, a pair of mono-stable vibrators such as one-shots 48 and 52. The output of amplifier 40 is connected to the input of one-shot 48, the output of the latter being connected to the other input terminal of gate 46.

A typical one-shot has a structure, for example, similar to the flip-flop heretofore described in that it may comprise a pair of switching transistors. In such case, however, the base of one transistor is coupled through a capacitor to the collector of the opposite transistor and thence returned through a resistance to B—. Upon switching the one transistor from a conducting to a non-conducting state, the one transistor will always return to its conducting state after a time delay determined by the RC constant of the circuit. Hence, the output of the one-shot is a quasi-stable pulse having a duration determined by the decay of the charge on the capacitor.

The means for inhibiting the signal output indicative of the other end point of the pressure gradient comprises another gating means such as a three-input gate 50. One input terminal of gate 50 is connected to the output of one-shot 48. The output of AND gate 46 is connected to the input of one-shot 52, the output of the latter in turn being connected to a second input terminal of gate 50. The third input terminal of gate 50 is connected to the output of flip-flop 42. When gate 50 is enabled, it is desired to have its output provide a pulse of unambiguous amplitude and duration iasmuch as the output of gate 50 is indicative of the other end point of the pressure gradient. Hence, in the embodiment disclosed, there is provided a bi-stable device, such as Schmitt trigger circuit 54, which has an output of substantially constant peak value for the period during which its input exceeds a specified value. The input of Schmitt 54 is connected to the output of gate 50, and the output of the Schmitt is applied to the input of amplifier 56. The output of the latter, in turn, is connected to the solenoid of valve 34. Similarly, the output of flip-flop 42 is applied to the input of amplifier 58, the output of the latter being connected to the solenoid of valve 32.

Since various types of bi-stable elements such as flip-flops and Schmitts, mono-stable multi-vibrators such as one-shots, and gating elements, are well known in the art, they have been indicated in the drawing in block form. It should be understood, however, that other elements capable of performing similar functions may also be employed and that the disclosure is not to be construed as limited to the specific type of element described. It should be further understood that the gates disclosed may take other logic forms to perform similar functions. For instance, one may employ disjunctive elements instead of conjunctive elements dependent upon the use of inverters in the input circuits thereto.

In operation, cuff 20 is carefully placed upon a limb, such as the arm of a patient, in the usual manner and microphone 36 is placed against the patient's arm adjacent the main artery below the cuff. The valve in conduit 24 is then opened allowing air under pressure to inflate the cuff and collapse the artery. Hence the air pressure in the cuff exceeds the systolic blood pressure. The valve in conduit 24 is closed and bleeder valve 22 is opened so that the air pressure in the cuff is allowed to diminish at a rate preferably not more than 2 or 3 mm. of Hg per second. The onset of arterial pulse sounds occurs when the cuff pressure has been reduced sufficiently to substantially match the systolic pressure in the artery. The valve in conduit 24 may be actuated by a pressure switch which will disconnect the cuff from its source of high pressure air when the pressure in the cuff reaches a predetermined value, for instance, beyond the highest systolic pressure expected such as 300 mm. of Hg. Bleeder valve 22 may also be coupled to the valve in conduit 24 so that as the latter closes, the former opens.

Both gauges 28 and 30 are connected to conduit 24 at the beginning of a measuring cycle, i.e., when bleeder valve 22 is opened to begin reducing the air pressure in the cuff. This is accomplished by having valves 32 and 34 respectively open at the beginning of the cycle. Hence, both gauges will read the maximum pressure present in the cuff, and as the pressure in the cuff is reduced, the drop will be reflected at least at the beginning by the readings of both gauges. When the first pulse sound indicative of systolic arterial pressure is picked up by microphone 36, it is transduced into an electrical pulse and amplified by amplifier 38 whose output is picked up and shaped to produce an electrical pulse signal from threshold amplifier 40. The pulse delivered by the threshold amplifier actuates flip-flop 42 to produce a signal which is applied to amplifier 58. The latter, in turn, amplifies the output of flip-flop 42 and applies it to the relay of valve 32 abruptly closing the latter. This locks gauge 28 at the pressure indication then representing the value of the pressure present in the cuff and indicative of the systolic arterial pressure. Hence, gauge 28 may be referred to as the systolic gauge.

The output of amplifier 40 is applied to one input terminal of gate 46. The output of amplifier 40 is also applied to one-shot 48, triggering the latter to produce a pulse of predetermined duration at least equal to the longest expected period between the expected pressure pulses picked up by microphone 36. When one-shot 48 is triggered by the input from amplifier 40, it delivers an output which is applied to the second input terminal of gate 46, the time interval between the application of the two signals to the input terminals of gate 46 being determined by the delay time in the operation of one-shot 48. The output of one-shot 48, together with the signal to the other input terminal of gate 46, enables gate 46 so that the latter then delivers an output signal which is applied to one-shot 52.

As will be seen in FIGURE 1, the output of one-shot 52 is applied to one input terminal of gate 50, the output of one-shot 48 is applied to another input terminal of gate 50, and the output of flip-flop 42 is applied to the third input terminal of gate 50. In the form shown, gate 50 is enabled only when there is no signal applied from both one-shots, and a signal is applied from flip-flop 42. Hence, gate 46 and the one-shots may be considered means providing a continuous sequence of disabling or inhibiting signals to gate 50 for at least the duration of the auscultatory pulse train. As will be apparent to those skilled in the art, the enabling requirements of gate 50 can be modified so that the latter may be enabled according to a variety of input circumstances.

Figure 2:
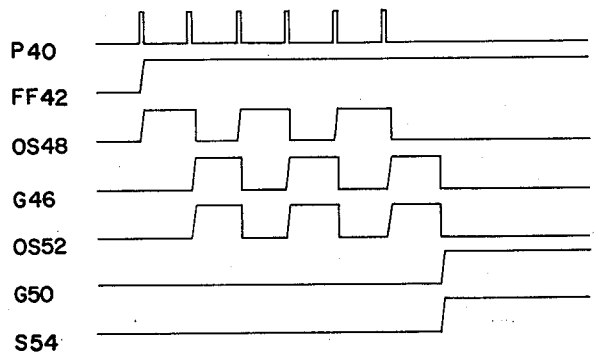
FIG. 2 is a diagrammatic representation of the wave forms present at selected points in the electronic circuitry of the invention during its operation.

As may be seen by reference to FIG. 2, the timing of the logic circuit of the invention prevents the enablement of gate 50 until the sequence of arteral pulse sounds picked up by microphone 36 ceases for a period in excess of the maximum expected time interval between successive arterial pulses. The pulse train identified by the letter P is indicative of the serial pulse train, and its timing, which train is the output of the threshold amplifier. On the same time axis, the next line, marked FF, exhibits the waveform output of flip-flop 42 and its relation to the threshold amplifier pulse train. As described, this substantially represents the time at which the solenoid of valve 32 is operated to close the valve and lock the systolic gauge. The third line, marked OS48, indicates the pulse train from one-shot 48, and it will be apparent that the signal output of the latter is initially triggered by the initial output pulse from the threshold amplifier and extends in time beyond the occurrence of the second pulse from the threshold amplifier. The enablement of gate 46 occurs periodically and substantially simultaneously with the occurrence of each pulse from one-shot 48. The next two lines of FIG. 2, marked G46 and OS52, respectively, are indicative of the output of gate 46 and of one-shot 52. It will be seen that the triggering of one-shot 52 occurs when the second pulse is delivered from the threshold amplifier and that the duration of the pulse from one-shot 52, like that of one-shot 48, exceeds the time interval between the individual pulses from the threshold amplifier. From FIG. 2 it will be seen that, following the initiation of the operation of one-shot 52, the output of one-shot 52 alternates with the output of one-shot 48 so that as long as there are pulses being sequentially delivered from the threshold amplifier and the interval between the pulses is less than the duration of the shortest output pulse from either of the one-shots, there is always an inhibiting pulse being applied by one or the other of the one-shots to gate 50.

As soon as the pulse train from the threshold amplifier ceases for a time greater than the duration of the pulse output of one-shot 48, gate 46 is disabled and one-shot 52 will no longer be triggered. Neither disabling pulse is then applied to gate 50. However, the output of flip-flop 42 is still applied to gate 50, and because gate 50 then meets the condition which enables it, the gate has an output with a waveform indicated at G50, FIG. 2. While the output of gate 50 could be employed to actuate a read-out, it is preferably applied to Schmitt 54, triggering the latter to produce a signal for as long as the signal from flip-flop 42 is applied to gate 50. The output signal of the Schmitt, shown at S in FIG. 2 is applied to amplifier 56 which amplifies the signal to actuate the solenoid of valve 34 for closing the latter and locking gauge 30 at a pressure indicative of the pressure present in the cuff at the time that the arterial pulse train picked up by microphone 36 had apparently ceased. The value then indicated by gauge 30 substantially represents the patient's diastolic blood pressure. Hence, gauge 30 may be termed the diastolic gauge. A reset pulse or command applied at input 45 of flip-flop 42 returns the flip-flop to its unset condition, disabling gate 50 and consequently returning the Schmitt 54 to a no-output condition. The relays operating valve 34 are constructed, as by spring-loading, so that wen flip-flop 42 is returned to its unset condition, thereby cutting off the input to the solenoids both valves 32 and 34 return to their open condition, placing the apparatus in condition for the start of the next measuring cycle.

Referring to FIG. 2, it will be seen that, in the embodiment shown, the input condition of gate 50 is such that the latter is temporarily disabled upon the initial pulse from flip-flop 42 accompanied by the signal from one-shot 48. Hence, Schmitt 54 will have no output and diastolic gauge 30 and systolic gauge 28 will read alike. However, as soon as flip-flop 42 is triggered, the solenoid of valve 32 closes the latter but valve 34 remains open, not to close until the arterial pulse train has run its course.

Figure 3:
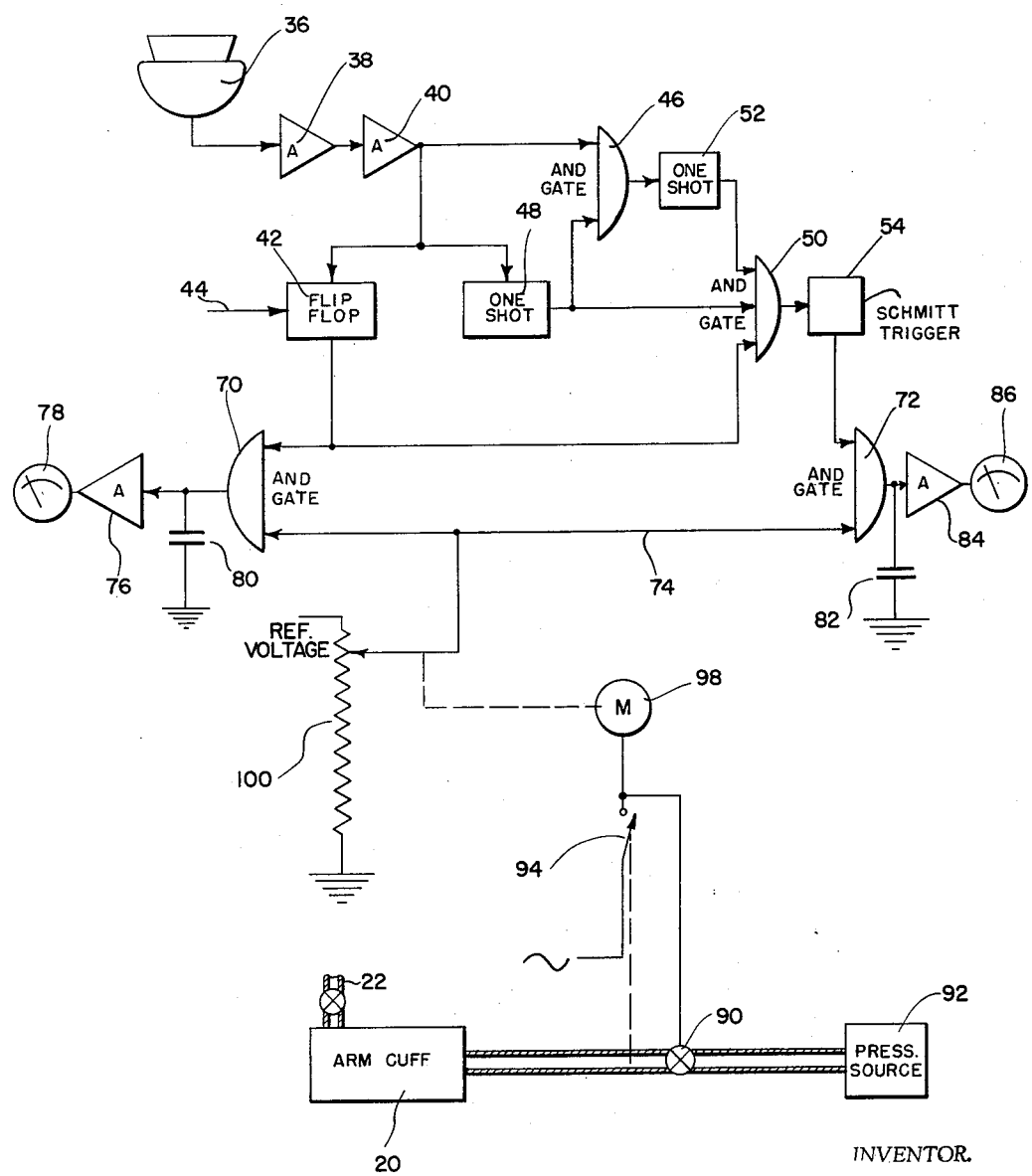
FIG. 3 is a schematic diagram of the mechanical elements and block diagram of the electronic elements of another embodiment of the present invention.

Yet, another embodiment of the present invention is shown in FIG. 3 in which is included a logic circuit, similar to that of FIG. 1, adapted to control electrical indicating devices rather than pneumatic valves, like numerals being employed to denote like parts. This embodiment includes a transducer or microphone 36 having an output connected to an amplifier 38, the latter, in turn, being connected to the input of threshold amplifier 40. The output of amplifier 40 is connected to one of two input terminals of flip-flop 42. The output of amplifier 40 is also connected to both one input of AND gate 46 and to an input of one-shot 48. The output of one-shot 48 is connected both to the other input of gate 46 and to one of three input terminals of AND gate 50. The enabling condition of gate 46 is that both input terminals be concurrently energized. The output of gate 46 is connected to the input of one-shot 52 whose output is connected to another input terminal of gate 50 while the third input terminal of gate 50 is connected to the output of flip-flop 42. The enabling condition of gate 50 in the form shown is the same as that of gate 50 in FIG. 1 in that an output occurs only when the input terminals connected to the one-shots are not energized and the input terminal connected to flip-flop 42 has a signal impressed thereon. The output of gate 50 is connected to the input of a bi-stable device, such as Schmitt 54. It will therefore be seen that the logic circuit of FIG. 3 is substantially the same as that of FIG. 1 both in structure and operation.

However, in the embodiment of FIG. 3, the output of flip-flop 42 is connected to one of two input terminals of AND gate 70, and the output of Schmitt 54 is connected to one of two input terminals of AND gate 72. The other input terminals of gate 70 and gate 72 are connected to one another by a common line 74. Both gates 70 and 72 are respectively disabled when both of their input terminals have signals impressed simultaneously thereon. The output of gate 70 is connected to the input amplifier 76, the output of the latter being connected to an electrical meter 78. The output of gate 70 is also grounded through capacitor 80.

The output of gate 72 is similarly led to ground through capacitor 82 and is also connected to the input of amplifier 84. The output of amplifier 84 is connected, in turn, to another electrical meter 86. The logic circuit of FIG. 3 is coupled electrically to means for comparing or matching the rate of change of a signal from a signal source with the rate of change of the pressure gradient occurring concurrently with the arterial pulse train, thereby deriving an electrical analog of the pressure gradient. One form of such a means for deriving the electrical analog and presenting same to the logic circuit is shown in FIG. 3, and comprises a pressure cuff 20 having the usual bleeder valve 22. The cuff is pneumatically coupled through a relay operated valve 90 to a pressure source 92. The pneumatic line between the cuff and valve 90 includes therein a pressure sensitive electrical switch 94 of known construction which is adapted to close at a relatively high predetermined pressure somewhat greater than the maximum expected systolic arterial pressure and open at a relatively low predetermined pressure substantially less than the lowest expected diastolic pressure. Switch 94 is electrically connected to the relay of valve 90 so as to open and close valve 90. Switch 94 is also connected to a source of electrical power employed to actuate valve 90 upon closure of the switch. The switch also connects and disconnects source 96 from a constant speed motor 98. The latter is mechanically coupled with the tap of a known type of non-linear potentiometer 100. The potentiometer winding is connected to a reference voltage source (not shown) while the tap is electrically connected to an intermediate point of line 74 in the logic circuit.

In operation, pressure from source 92 drives a fluid, such as air, through open valve 90, inflating cuff 20 until a predetermined pressure, for example 300 mm. of Hg, is present in the cuff. Switch 94 is then closed by the high pressure, thereby cutting the cuff off from its pressure source and simultaneously starting motor 98. Bleeder valve 22 allows the pressure in cuff 20 to fall off at a controlled and predetermined rate which is generally non-linear. The winding of potentiometer 100 is so constructed in known manner and the speed of rotation of motor 98 is so arranged that there is a one-to-one correspondence between the pressure in the cuff and the voltage appearing at the potentiometer tap. Hence, the output of the potentiometer applied to the respective terminals of gates 70 and 72 is an analog of the pressure in the cuff.

At the start of a measuring cycle, both gates 70 and 72 are enabled, i.e., the voltage at the potentiometer tap is applied to high impedance amplifiers 76 and 84 as long as no signal is applied respectively to gate 70 by flip-flop 42 and to gate 72 by Schmitt 54. As previously described in connection with FIG. 1, the first pulse sound picked up by microphone 36 is applied to linear amplifier 38 and then to threshold amplifier 40 to produce an output pulse. At the time the first pulse is produced by threshold amplifier 40, the pressure in the cuff is substantially equal to the systolic pressure. At this time, the output of amplifier 40 sets flip-flop 42, applying a pulse to gate 70 and disabling the latter. However, high impedance amplifier 76 is held at a value of voltage which corresponds to the voltage across capacitor 80; this latter voltage is equal to the voltage which appeared on the potentiometer tap at the time when the first pulse was observed. The output of amplifier 76 is indicated on indicator or meter 78 which is preferably calibrated in mm. of Hg. The value indicated on meter 78 is held substantially constant during the discharge time of capacitor 80; and since the input impedance of amplifier 76 is preferably very high and the value of capacitor 80 is preferably quite large, the time constant of discharge is long with regard to the period of measurement. Thus the value indicated on meter 78, which indicates the systolic pressure, will remain substantially constant until reset by the beginning of a new cycle.

Following the first pulse picked up by microphone 36, the operation of gate 46, one-shots 48 and 52, gate 50 and Schmitt 54 are substantially as described hereinbefore with respect to the embodiment of FIG. 1. It is apparent that Schmitt 54 will be triggered to deliver an output following the appropriate time interval after the last arterial pulse sound observed by microphone 36. And at this time, the diastolic pressure is substantially equivalent to the pressure in cuff 20. The output of Schmitt 54 therefore disables gate 72 and the value of the voltage present at that time on the potentiometer tap is stored in capacitor 82, observed by high impedance amplifier 84 and indicated on the indicator or diastolic meter 86. The latter is also preferably calibrated in mm. of Hg. It is apparent that as the voltage on the potentiometer tap is progressively reduced by movement of the latter by motor 98, the voltage stored in capacitor 82 is reduced accordingly inasmuch as the capacitor tends to continuously discharge along the low impedance path through gate 72 to the potentiometer. Immediately as gate 72 is disabled, the capacitor discharge must then proceed through amplifier 84 and be read out on meter 86. This indicates, in the example described, the diastolic pressure.

In yet a further modification of the embodiment of FIG. 3, a differential amplifier such as that disclosed in U.S. Patent No. 2,896,031, issued July 21, 1959, to F. M. Young, may be connected across the inputs of amplifier 76 and 84 to thereby give an indication directly of the total pressure differential between the end points of the arterial pressure gradient.

While the operation of the embodiments described has proceeded by determination of end points by progression along the pressure gradient from high to low pressures, it is apparent that the progression may also proceed in the opposite direction from low to high pressures in the cuff.

The embodiment of FIG. 3, as described hereinbefore is an apparatus which compares the rate of decay of the pressure in the cuff with the position of a non-linear potentiometer to derive an analog signal. Alternative constructions may also be employed wherein the decay of cuff pressure is compared with signal sources other than potentiometers. For instance, it may be assumed that the rate of decay of pressure in the cuff is an exponential function. In such instance, the constant speed motor and non-linear potentiometer of the embodiment of FIG. 3 may be replaced by a constant voltage source and a storage capacitor. The capacitor is so chosen that the time constant of its discharge is matched to the decay rate of the air pressure in the cuff.

Other modifications of the invention can also be made. For instance, one of the problems in detecting blood pressure lies in extraneous noises such as room noises, muscle noises, etc., picked up by the microphone in addition to the desired pulse sounds. The effects of this extraneous noise can be further minimized by time filtering. For example, an auxiliary microphone can be provided at some other point, such as adjacent the heart, where pulse sounds are always present in a viable patient and usually strong. The signal produced by the auxiliary microphone is then amplified and the lead edge of this signal is employed to trigger a one-shot whose "on" time is just slightly longer than the duration of the pulse present below the cuff and picked up by the primary microphone. The output of this one-shot is used to enable a gate which is in series with the output of the amplifier of the primary microphone. Thus, primary microphone noises which would ordinarily be transmitted during the period between pulses are not allowed to reach the threshold amplifier because of the action of this gate. This modified structure statistically reduces the possibility of erroneous signals being fed into the logic circuit, the reduction being according to the ratio of the time between signals with respect to the time duration of the signals. Another alternative time filtering structure using the same basic circuit heretofore disclosed eliminates the auxiliary microphone and substitutes therefor a pair of electrocardiograph leads. The output of the leads are fed to a one-shot for triggering the latter. The output of the one-shot as previously described is employed to enable a gate so that the input from the primary microphone to its threshold amplifier will pass only during the enabled condition of the gate.

A further refinement of the invention can be made by applying a pre-programmed gain control to amplifier 38. In the operation of the invention, as the pressure in the cuff drops toward the diastolic value, the pulse sounds apparent to the cuff microphone become progressively weaker. Hence, amplifier 38 can be provided with an automatic gain control system having a rate of change which corresponds to the rate of change of the pressure in the cuff. This amplifier gain control is preferably triggered at the time that the first systolic pulse is recorded, and raises the gain of the amplifier as the signal level successively decreases.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. An automatic sphygmomanometer comprising, in combination, an inflatable and deflatable cuff adapted to be placed about an extremity of an individual, means for inflating and deflating said cuff through a pressure gradient including the systolic and diastolic pressures of said individual, a transducer responsive to the train of pulse sounds occurring concurrently with said pressure gradient between said systolic and diastolic pressures for producing electrical signals corresponding to each pulse sound, amplifier means for amplifying the electrical signals from said transducer, first bi-stable means responsive to the initial output signal from said amplifier means for producing an electrical pulse, first indicator means responsive to said electrical pulse from said first bi-stable means for indicating the pressure present in said cuff at the time of said initial pulse, second bi-stable means for producing an output signal, second indicator means responsive to said output signal of said second bi-stable means for indicating the pressure present in said cuff at the time of said output signal, gating means for controlling said second bi-stable means, and means connected to said amplifier means for generating a continuous sequence of signals for disabling said gating means for at least the total duration of said train.

2. An automatic sphygmomanometer comprising, in combination, an inflatable and deflatable cuff adapted to be placed about an extremity of an individual for collapsing an artery in said extremity, means for inflating and deflating said cuff through a pressure gradient which includes the systolic and diastolic levels of said individual, a microphone for producing electrical signals corresponding to the train of pulse sounds occurring concurrently with said pressure gradient between said levels, a first amplifier for amplifying the output signals from said microphone, a second amplifier for producing electrical pulses of predetermined waveform and amplitude corresponding to and responsive to the amplified electrical signals from said microphone, a first bi-stable element coupled to said second amplifier for producing a first output signal responsively to the initial electrical pulse from said second amplifier, a first indicator coupled to said first bi-stable element and actuated by the output of the latter for indicating the pressure present in said cuff at the time of said initial electrical pulse, said first indicator being coupled to the pressure in said cuff, a second bi-stable element actuatable for producing a second output signal, a second indicator coupled to the pressure in said cuff and responsive to said second output signal for indicating the pressure in said cuff present at the time of said second output signal, a first gate for controlling the actuation of said second bi-stable means, and signal generating means for disabling and enabling said first gate, said signal generating means being connected to said second amplifier for producing signals responsively to the train of electrical pulses from said second amplifier, said first gate being disabled by said signals from said signal generating means and being enabled by the termination of the disabling signals responsively to the termination of pulse sounds.

3. An automatic sphygmomanometer as defined in claim 2 wherein said signal generating means for disabling and enabling said first gate comprises a second gate having a pair of input terminals and an output terminal, one of said input terminals being connected to the output of said second amplifier, a first mono-stable vibrator having its input connected to said second amplifier and its output connected to the other terminal of said second gate, the output of said first mono-stable vibrator also being connected to an input of said first gate for applying a disabling signal thereto, a second mono-stable vibrator having its input connected to the output of said second gate and having its output connected to an input terminal of said first gate for applying a disabling signal thereto, the output of said first bi-stable element being connected to another input terminal of said first gate, said first gate being enabled when no disabling signal is applied thereto and a signal from the first bi-stable element is applied thereto.

4. An automatic sphygmomanometer as defined in claim 2 wherein said first and second indicators are both pneumatically coupled to said pressure in said cuff.

5. An automatic sphygmomanometer as defined in claim 2 including means for producing electrical signals as an analog of the pressure in said cuff and wherein said first and second indicators are electrically coupled to said means for producing said analog signals.

6. An automatic sphygmomanometer as defined in claim 5 wherein said first and second indicators are electrical meters, and comprising means for coupling said first indicator to said first bi-stable element, and means for coupling said second indicator to said second bi-stable element; said means for coupling said first bi-stable element to said first indicator including a third gate having a pair of input terminals and an output terminal, one of said input terminals of said third gate being connected to said first bi-stable element whereby a signal from the latter disables said third gate, the output terminal of said third gate being connected to said first indicator through a first high impedance amplifier, and first charge storage means connected between said output of said third gate and said first high impedance amplifier; said means for coupling said second indicator to said second bi-stable element comprising a fourth gate having a pair of input terminals and an output terminal, one of said input terminals of said fourth gate being connected to the output of said second bi-stable means whereby a signal from the latter disables said fourth gate, the output terminal of said fourth gate being connected to said second indicator through a second high impedance amplifier, and second charge storage means connected between said fourth gate and said second high impedance amplifier; the other input terminals respectively of said third and fourth gates being connected to one another and to said means for producing said analog signals.

References Cited in the file of this patent

UNITED STATES PATENTS

| | | |
|---|---|---|
| 2,827,040 | Gilford | Mar. 18, 1958 |
| 2,865,365 | Newland | Dec. 23, 1958 |